(12) United States Patent
Hantunen et al.

(10) Patent No.: US 6,658,275 B1
(45) Date of Patent: Dec. 2, 2003

(54) COMMUNICATION DEVICE HAVING A COUPLER WITH A CONNECTION POINT

(75) Inventors: Keijo Hantunen, Tampere (FI); Kari Lehtinen, Tampere (FI); Jouko Rytkönen, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/553,626

(22) Filed: Apr. 20, 2000

(30) Foreign Application Priority Data

Apr. 22, 1999 (FI) .................................................. 990909

(51) Int. Cl.[7] .............................................. H04Q 7/20
(52) U.S. Cl. ................................ 455/575.3; 455/550.1; 455/575.1; 379/433.13
(58) Field of Search ....................... 455/90, 424, 74.1, 455/550, 550.1, 575.1, 575.3; 16/303; 379/433.13

(56) References Cited

U.S. PATENT DOCUMENTS 5,475,872 A * 12/1995 Sato ............................. 455/89
5,548,824 A * 8/1996 Inubushi ...................... 455/90
6,219,257 B1 * 4/2001 Arnold ........................ 361/814
6,280,258 B1 * 8/2001 Frohlund ..................... 439/700

FOREIGN PATENT DOCUMENTS

EP          0 720 339 A2  *  3/1996  ............ H04M/1/02
EP          95309528.8    *  3/1996  ............ H04M/1/02

* cited by examiner

Primary Examiner—William Trost
Assistant Examiner—Brandon J Miller
(74) Attorney, Agent, or Firm—Perman & Green, LLP

(57) ABSTRACT

A communication device (1) comprising a first part (2); a second part (3); coupling means (4) for coupling the first (2) and the second part (3) and allowing a mutual movement about a hinged joint (AA); and a connection point (5) for an insertable plug. Said point of connection (5) is arranged to said coupling means (4) and it substantially coincides with the hinged joint (AA) of the device (1). Consequently, the external connection will not interfere with the pivoting movement nor will it complicate handling and holding of the device.

16 Claims, 3 Drawing Sheets

COMMUNICATION DEVICE HAVING A COUPLER WITH A CONNECTION POINT

FIELD OF THE INVENTION

The present invention relates to telecommunications and especially to a communication device that comprises a first part, a second part, coupling means for coupling the first and the second part while allowing a mutual movement about a hinged joint, and a connection point for an insertable plug.

BACKGROUND OF THE INVENTION

The trend in telecommunications is towards a collaboration of different media types, e.g. voice, data and video. In consequence, the use and configuration of communication devices is diversifying, and especially a need for a sizeable display increases. A screen is typically a sensitive element and it is therefore preferably arranged on a surface of the device that can be covered when the display is not accessed, e.g. when the device is in a pocket. Even without any sensitive components in the inner surface, a structure with some kind of moving housing is often preferred since it allows smaller design and protects privacy of a discussion when opened. In such solutions, some type of hinging that allows the two parts to be pivoted into open and closed positions is used.

The housing of a communication device generally comprises one or more connection points for external releasable connectors, generally in the bottom of the device. For instance, the battery of the device is typically loaded using a charger that is connected to the device by a cable plugged into a connection point. Sometimes the device is also connectable to an external device, e.g. an additional user interface or a computer by a releasable cable.

In prior art, connectors for plugs are typically placed inside a hole in the bottom end, top end or in the sides of the device. When the device comprises a two-part structure where the parts are pivotable in relation to each other, a plug in the bottom end and in the lower part of the sides interferes with the pivoting movement. Whenever a moving housing is used, the connector must be placed not to obstruct the movement, or it must be assumed that the plug is always pulled out if it is in the way. Especially in solutions where a relatively large pivoting movement (e.g. with an opening angle of over 180 degrees between the parts) is necessary, placing the connectors in the bottom end or in the sides of the device is impractical or even impossible. Having connectors in the top end of the device is equally impractical since mobile devices are typically very small and light and a cable hanging and twisting in the top end greatly inconveniences the handling and holding of the device.

SUMMARY OF THE INVENTION

Now a communication device has been invented where the above noted problem of placing the connectors in a device with a moving housing is obviated or at least mitigated. According to the first aspect of the invention the communication device comprises a first part; a second part; coupling means for coupling the first and the second part and allowing a mutual movement about a hinged joint; a connection point for an insertable plug; and is characterised in that said connection point is arranged into said coupling means and the connection point substantially coincides with the hinged joint of the device.

In the invented device the connection point is arranged to the axis around which the pivoting movement occurs. The connector is placed at the hinged joint or to the hinged joint. With such an arrangement the connection will not interfere with the pivoting movement nor will it complicate handling and holding of the device. The space needed for connectors and the hinge mechanism inside the device is decreased. Furthermore, the invented solution facilitates an arrangement where separate connectors are placed in the hinged joint and under it. With such an arrangement the different parts in a two-part structure can have independent inputs and outputs through one point of connection. In general, enhanced freedom of design is accomplished.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
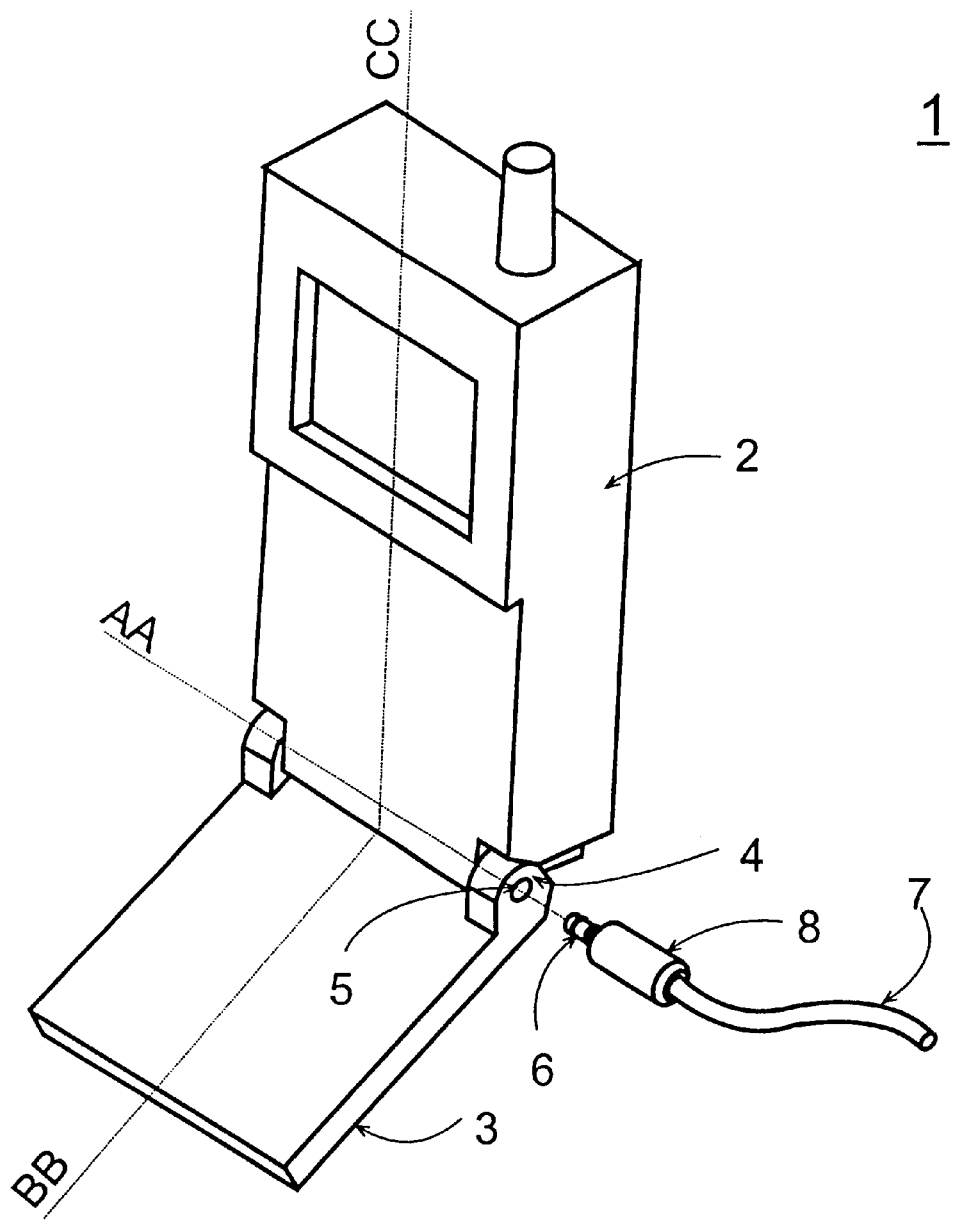
FIG. 1 illustrates an embodiment of a mobile communication device according to the invention.

FIG. 1 illustrates an embodiment of a communication device 1 according to the invention. The communication device divides into two structural parts. In the embodiment shown here the first part comprises a main body 2, which houses most of the electronic circuitry for controlling the device 1 together with a power supply battery. The second part comprises a lid or a flap 3 pivotably coupled to a lower edge region of the body 2. Means for coupling comprise a hinge 4 arranged so that the lid 3 can be rotated about a hinge axis AA which is preferably perpendicular to the longitudinal axes BB of the lid 3 and CC of the body 2.

As shown in FIG. 1 the hinge 4 comprises an opening dimensioned to enable a plug 6 to be pushed inside the device. The opening is preferably arranged to fasten the plug 6 to its position as long as it is inside the device, and to release the plug 6 when it is pulled out. In FIG. 1 the plug 6 is connected to a cable 7 and provided with a gripping surface 8 to facilitate the plugging. As for the cable, alternative means of connection are possible, for example an external connection unit for using unlicensed low power radio (LPRF) or infrared (IR) frequencies requiring usage of external connection unit plugged into the device.

Figure 2:
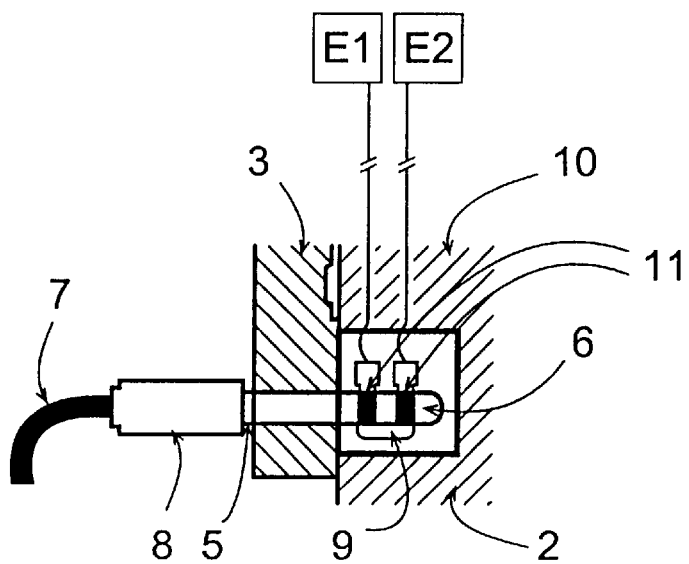
FIG. 2 illustrates a more detailed structure of the embodiment of the nvention.

In FIG. 2 a more detailed structure of the invented solution is presented. Through the opening 5 in the hinge 4 the plug 6 extends to a connecting element 9 in the main body 2. The connecting element 9 is wired with lines 10 to the functional elements E1, E2 in the main body 2 of the device 1. The connecting element 9 is preferably a solid structure, made of metal or other electrically conductive material, dimensioned to get into contact with the plug 6 when it is plugged into the device. Furthermore, the connecting element 9 preferably allows the plug 6 to be turning with the movement of the moving housing without losing the contact. An example of such structures is a plug 6 with a cylindrical shape and as a connecting element 9 a terminal lug with a cylindrical hole matching with the dimension of the plug 6. The lug 9 comprises one or more drag surfaces 11 connected to separate lines 10 for supplying one or more separate connections to the device.

Figure 3:
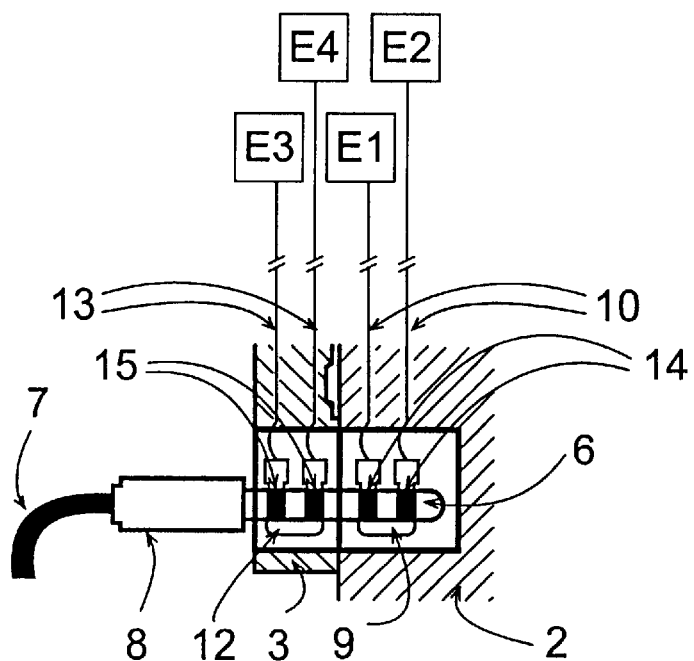
FIG. 3 illustrates a second embodiment of the invented solution.

In FIG. 3 another embodiment of the invented solution is presented. In some devices both of the two parts comprise one or more functional elements of the device. In this embodiment the main body 2 comprises the first connecting element 9 wired with the first lines 10 to the elements E1–E2 in the main body 2 of the device 1. Furthermore, the lid 3 comprises a second connecting element 12 wired with second lines 13 to the elements E3–E4 in the lid 3. The lug 9 preferably comprises a first set of drag surfaces 14, comprising one or more of said drag surfaces, and connected by separate lines 10 to the functional elements E1–E2, for providing one or more separate connections to the main body 2, and a second set of drag surfaces 15, comprising one or more of said drag surfaces, and connected by separate lines 13 to the functional elements E3–E4, for providing one or more separate connections to the lid 3. With such an arrangement one point of connection can be used to deliver signals to and from the different parts of the device, here the main body 2 and the lid 3.

Figure 4:
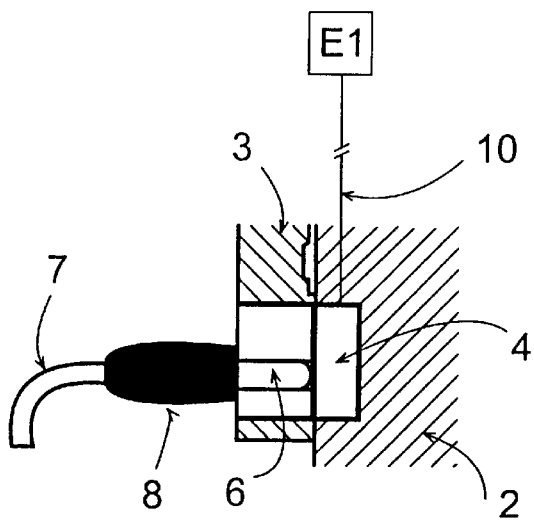
FIG. 4 illustrates a third embodiment of the invention.

In FIG. 4 another embodiment of the invented solution is presented. In this embodiment the hinge 4 acts as a connecting element that extends through the lid 3 to the main body 2, and is wired with lines 10 to the element E1 in the main body. When the plug 6 is pushed into the opening, it gets into contact with the hinge and is thus connected with the element E1. The presented embodiment allows use of a shorter plug and enhances robustness of the invented structure.

The elements E1–E4 shown in FIG. 2 and 3 illustrate different functional elements of the device accessible through a connection point as shown described here. Such an element can be a battery of the device that is connected to an external charger. Such elements can also comprise input and output elements for different user interfaces e.g. a display, a loudspeaker, a keyboard, or a microphone; data input and output elements, control elements etc.

For example, in the embodiment shown in FIG. 2 the element E1 is the battery of the device and the element E2 is the keyboard driver of the device. Using only one plug the device is thus charged and an external keyboard is connected to the device.

Figure 5:
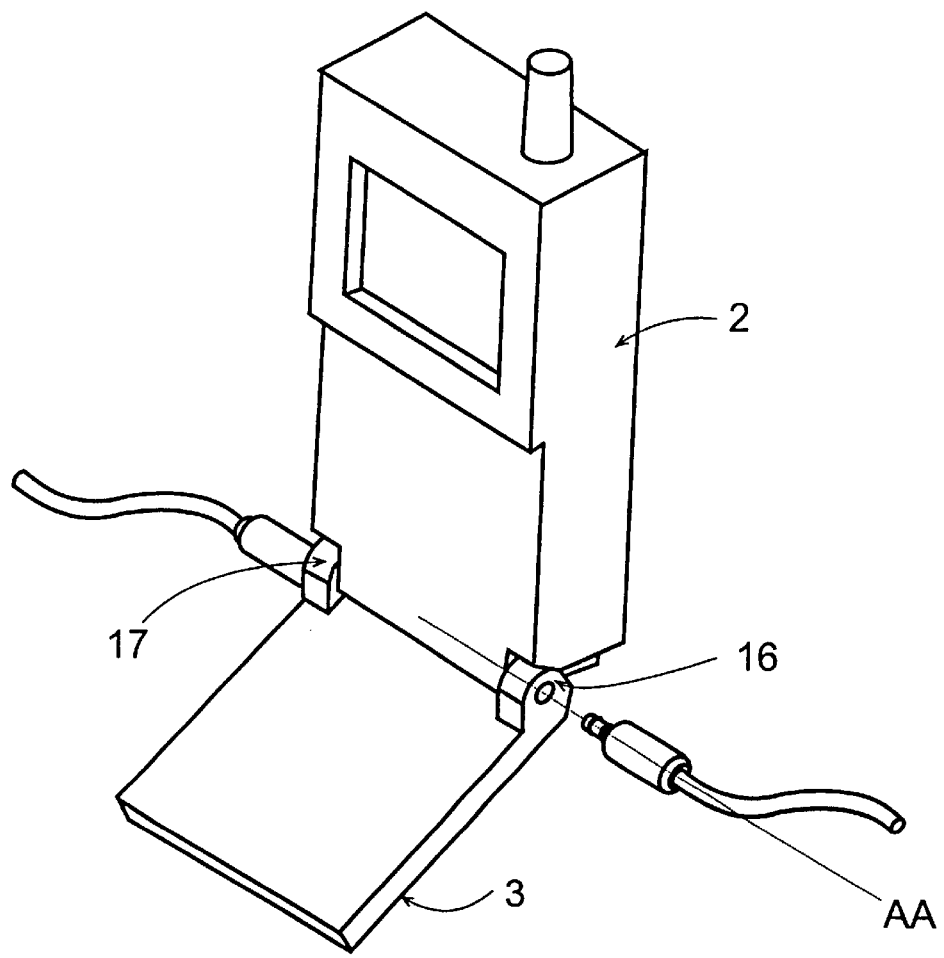
FIG. 5 illustrates a fourth embodiment of the invention.

In FIG. 5 an embodiment with two points of connection arranged in opposite sides of the device is presented. The hinge that couples the first part and the second part comprises a first end 16 and a second end 17 in the opposite sides of the device along the hinged joint AA. The first end and the second end both comprise an opening for connecting an insertable plug and a connecting element for providing a connection to at least one functional element as described earlier. Depending on the application, the connecting elements can be in the first part or in the second part on in both of them. The presented embodiment facilitates a number of simultaneous connections without complicating the handling and holding of the device. For example the presented arrangement allows charging of the battery through a connection in the other side of the device and signalling using a serial cable through a connection in the opposite side of the device.

Although the invention has been shown and described in terms of preferred embodiments, those persons of ordinary skill in the art will recognise modifications to the preferred embodiment may be made without departure from the scope of the invention as claimed below.

What is claimed is:

1. A communication device comprising:
   a first part;
   a second part;
   coupling means for coupling the first and the second part and allowing a mutual movement about a hinged joint (AA); and
   a connection point for an insertable plug for connection to an external device;
   wherein
   said connection point is arranged into said coupling means and the connection point is located at the hinged joint (AA) of the device.

2. A device according to claim 1, wherein the coupling means comprise a hinge; and said connection point comprises an opening in the hinge, and a connector arranged to make a contact with a plug inserted into the opening.

3. A device according to claim 2, wherein the connector is arranged to provide connection to at least one of the following: the first part and the second part.

4. A device according to claim 2, wherein the connector comprises at least one terminal lug, said lug comprising one or more drag surfaces for a number of separate connections to either of the first and the second part.

5. A device according to claim 2, wherein the shape of the opening is cylindrical.

6. A device according to claim 3, wherein said opening extends through the first and the second part of the device and the connection point further comprises a first connector for providing a connection to the first part and a second connector for providing a connection to the second part.

7. A device according to claim 4, wherein at least one of said connections is to a power supply of the device (E1).

8. A device according to claim 4, wherein at least one of said connections is to a keyboard driver of the device (E2).

9. A device according to claim 2, wherein the hinge is arranged to be said connector.

10. A device according to claim 2, wherein the hinge comprises a first end and a second end, and each end comprises a connection point for an insertable plug.

11. A communication device comprising:
    a first part;
    a second part; and
    a coupler for coupling the first and the second part about a hinged joint, the coupler having a connection point for a connection to an external device.

12. The communication device according to claim 11, wherein the hinged joint allows a mutual movement of the first and second parts.

13. The communication device according to claim 11, wherein the connection point comprises an opening for receiving an insertable plug.

14. The communication device according to claim 11, wherein the connection to an external device comprises one or more of a cable, a radio frequency connection, or an infrared frequency connection.

15. The communication device according to claim 1, wherein the communication device comprises at least one connection point at the hinged joint, and the at least one connection point is for at least one of:
    charging the communication device and
    signaling using a serial cable.

16. The communication device according to claim 14, wherein the communication device comprises at least one connection point at the hinged joint, and the at least one connection point is for at least one of:
    charging the communication device and
    signaling using a serial cable.

* * * * *